Dec. 4, 1928.  
H. C. HEBIG  
1,693,984  
SPHERICAL HEAT INDICATOR FOR AUTOMOTIVE INTERNAL COMBUSTION ENGINES  
Filed April 29, 1927  2 Sheets-Sheet 1

INVENTOR  
H. C. HEBIG  
BY  
Hammond Littell  
ATTORNEY

Dec. 4, 1928.

H. C. HEBIG 1,693,984

SPHERICAL HEAT INDICATOR FOR AUTOMOTIVE INTERNAL COMBUSTION ENGINES

Filed April 29, 1927       2 Sheets-Sheet 2

INVENTOR
H.C.HEBIG
BY
Hammond Littell
ATTORNEY

Patented Dec. 4, 1928.

1,693,984

UNITED STATES PATENT OFFICE.

HENRY C. HEBIG, OF HOFFMANS, NEW JERSEY, ASSIGNOR TO HARRISON HURLBERT BOYCE, OF JERICHO, NEW YORK.

SPHERICAL HEAT INDICATOR FOR AUTOMOTIVE INTERNAL-COMBUSTION ENGINES.

Application filed April 29, 1927. Serial No. 187,433.

The invention relates to devices for indicating by the heat condition within the radiator, the condition of the cooling system of an automotive internal combustion engine.

One of the objects of this invention is to provide a new and novel device for indicating the condition within an automobile radiator.

Another object of this invention is to provide an indicating device for indicating the condition within an automobile radiator having a spherically extending indicating column.

Another object of this invention is to provide an indicating device for indicating the condition within an automobile radiator, the indication of which may be read from all lateral directions with equal facility.

A further object of this invention is to provide a transparent or translucent substantially spherical indicating column casing for a device for indicating the condition within an automobile radiator having a solid substantially spherical center and a spherically extending indicating column chamber extending from near the bottom of the sphere to a point near the top thereof.

Another object of this invention is to provide a new and novel method of constructing an indicating device for indicating the heat condition within an automobile radiator.

Other objects and advantages of my invention will be apparent from the description, claims, and appended drawings, in which:—

Figure 4:
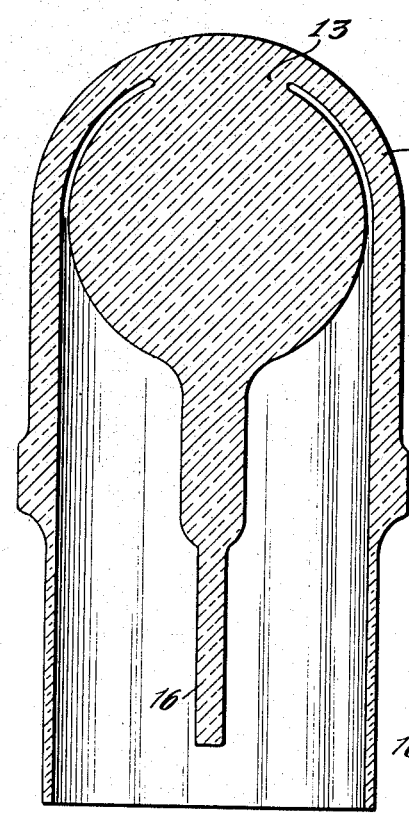
Figure 5:
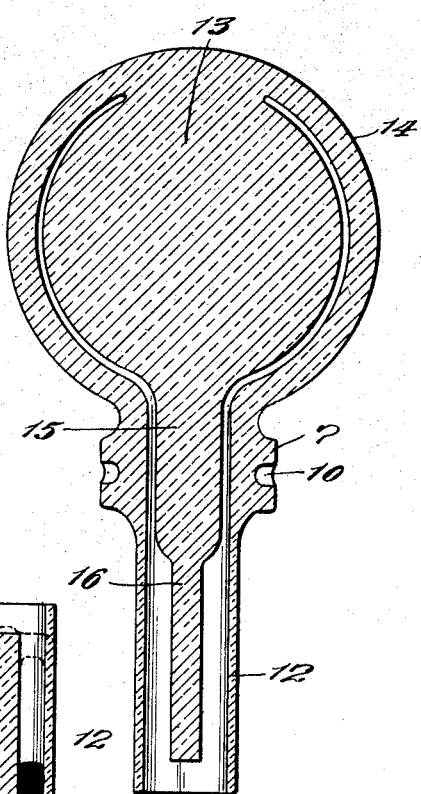
Figure 6:
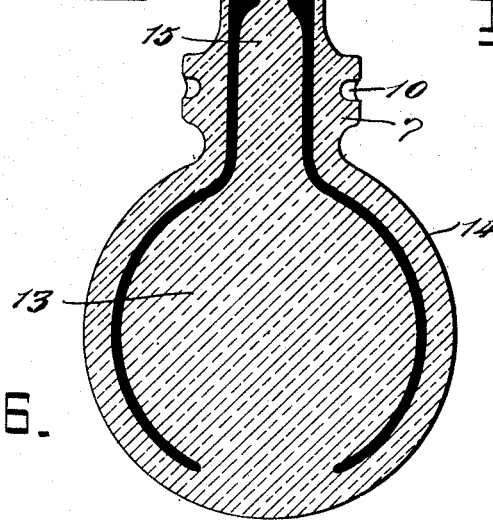

Figs. 4, 5, and 6 are views illustrating various steps in the forming of the combined transparent or translucent casing and indicating element chamber.

My device as is clearly shown in the drawings is comprised essentially of two portions, a base part 1 and a combined casing and indicating member 2. The base 1 is formed with a threaded shouldered stem 3 adapted to extend through a radiator cap and to be locked to said cap by a nut 5 with the shoulder 4 in contact with the outer surface of the cap. The base member 1 is formed hollow and with a recess 6 at the upper end thereof in which the base 7 of the combined casing and indicating member 2 is secured and seated against a gasket 8.

The base 7 is formed to loosely fit within the recess 6. Threaded apertures are formed in the side walls of the recess 6 and in these apertures set screws 9 are inserted. The base 7 of the member 2 is formed with a peripheral groove 10 alined with the setscrews 9 and receiving the said screws to securely lock the base member 1 to the combined casing and indicating member 2. The alinement of the setscrews and peripheral groove may if desired be such that the base 7 will be drawn downward and firmly seated against the gasket 8 by the entrance of the setscrews in the groove.

Figure 2:
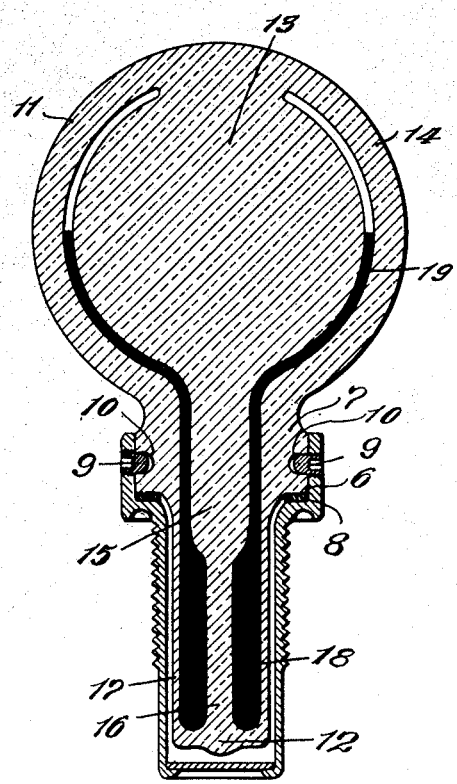
Fig. 2 is a cross-section taken on the line 2—2 of Fig. 1.
Figure 3:
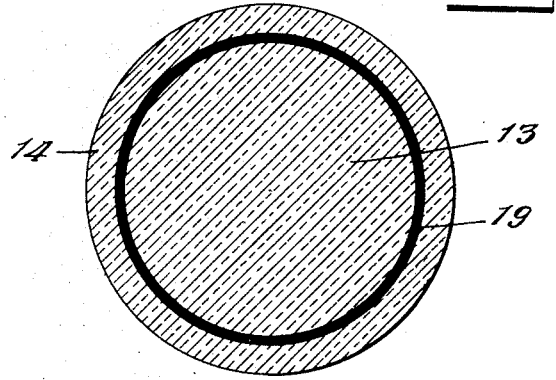
Fig. 3 is a cross-section taken on the line 3—3 of Fig. 1.

The combined casing and indicating member 2 is formed with an upper spherical casing member 11 from the lower portion of which a downwardly projecting stem 12 extends into the hollow base member 1. The base 7 is formed integral with the upper portion of the stem 12 and the lower portion of the casing member 11, as shown in Fig. 2.

I will now describe in detail my combined casing and indicating member 2. This member, as is shown in the drawings, comprises an upper substantially spherical housing member 11 and a downwardly projecting indicating liquid containing stem 12.

The casing 11 is formed entirely of glass, bakelite, or other transparent or translucent material with a solid substantially spherical central portion 13 and an outer casing portion 14 spaced therefrom except at the top to form a spherically extending chamber 19 therebetween. The central portion 13 and the casing 14 may be cast, molded or otherwise formed integral or may be separately formed by casting, molding, or in any other suitable manner and connected together at the top in any suitable manner. The base member 7 is formed integral with the outer casing 14 and the downwardly projecting stem 12 as hereinbefore described. Projecting downwardly from the spherical member 13 and within the hollow stem 12 is a solid member 15 of glass or other translucent or transparent material spaced from the inner walls of the hollow stem and reduced in cross-section near its lower end 16 thus providing an enlarged indicating liquid chamber 17, between the stem 15 and the hollow stem 12 of the casing 11.

The lower end of the stem 12 is sealed by fusing or in any other suitable manner and united to the lower end of the reduced portion 16 of the stem 15 to form the chamber 17. The chamber 17 is filled with an indicating liquid 18 the volume of which increases upon increase in temperature. A sufficient amount of this liquid in contained in the chamber 17 to extend into the indicating chamber 19 throughout the range of normal heat conditions prevailing in the space above the water in an automobile radiator. Variations in the heat conditions in the space above the water in the radiator will, of course, cause variations in the volume of the indicating liquid 18 and therefore changes in the height to which the same rises in the chamber 19. These changes will indicate to the operator of the automobile equipped with my device the condition existing within the radiator and therefore in the cooling system of the automobile engine.

Figure 1:
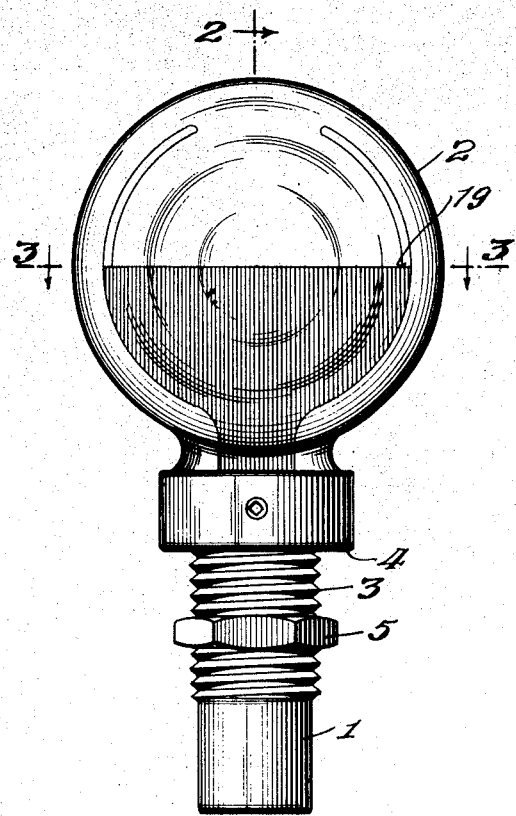
Fig. 1 is an elevation view of my improved device for indicating the condition within a radiator.

In forming the indicating member 2 integrally I have found it convenient to cast, mold, or otherwise form the same as shown in Figure 1. If formed in two parts that is, an outer portion or casing 14 and an inner portion or core 13, each may be cast, molded, or formed separately in any other desired manner. The core 13 is then inserted in the casing 14 and the two parts secured together, as shown in Figure 4, in any appropriate manner as by fusing or cementing.

The lower portion of the casing member 14 may now be drawn, pressed, molded, or brought in any other suitable manner to the form shown in Fig. 5 thus leaving a spherically extending chamber around the core portion 13 and a downwardly extending chamber or hollow stem 12 enclosing the stem portions 15, 16 of the core. As shown in Figure 5, the casing 14 is built up in thickness at the top of the chamber 17 and formed into a circular base 7 provided with the peripheral annular groove 10. There are a great many ways in which the base 7 may be built up and the groove 10 formed therein such as by molding, pressing, or drawing.

The device is now inverted and the necessary amount of indicating liquid placed in the chamber. The remainder of the space within the chamber is now evacuated and the bottom of the stem 12 sealed, as shown in Fig. 2. It will be noted that in sealing the lower end of the stem 12 the same is united to the lower end 16 of the stem 15 of the spherical core member 13 thus firmly anchoring the core member in position.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. In a device for indicating the heat condition within a radiator, a unitary transparent casing formed with an indicating liquid chamber, and a core substantally the size of the casing extending across said chamber and fixed to said casing at each end, the intermediate space being substantially filled with a colored heat reacting liquid.

2. In a device for indicating the heat condition within a radiator, a transparent spherical indicating element casing formed with a spherical core, a spherically extending element chamber substantially surrounding said core, projections from said casing and said core, said projections formed into a substantially annular indicating liquid chamber and a heat responsive indicating liquid in said chamber and visible from the outside of said casing.

3. In a device for indicating the heat condition within a radiator, a spherical light penetratable indicating element casing formed with a spherical core, a spherical extending indicating element chamber substantially surrounding said core, projecting from said casing and said core, said projections formed into a substantially annular indicating liquid chamber, and a heat responsive liquid in said chamber.

4. In a device for indicating the heat condition within a radiator, a spherical core having an outwardly projecting stem formed integral therewith, a light penetratable casing surrounding said core and stem and spaced therefrom and cooperating therewith to form an indicating liquid chamber and a spherically extending indicating chamber and a heat responsive indicating liquid within said indicating liquid chamber and visible from the outside of said casing when forced into the spherically extending chamber by certain heat conditions.

5. In a device for indicating the heat condition within a radiator, a light penetratable casing, a core within said casing forming in conjunction with said casing, an indicating chamber visible from without said radiator and an indicating liquid chamber communicating therewith and subject to heat changes within said radiator and a heat responsive indicating liquid in said latter chamber.

In testimony whereof I have affixed my signature to this specification.

HENRY C. HEBIG.